United States Patent [19]

Nordin

[11] Patent Number: 4,637,105

[45] Date of Patent: Jan. 20, 1987

[54] STRINGTAPE ROLL FOR VENETIAN BLINDS

[75] Inventor: Inge Nordin, Hisings-Backa, Sweden

[73] Assignee: Pede AB, Hisings-Backa, Sweden

[21] Appl. No.: 783,661

[22] Filed: Oct. 3, 1985

[30] Foreign Application Priority Data

Oct. 3, 1984 [SE] Sweden ................................ 8404939

[51] Int. Cl.⁴ .......................... B23D 19/04; E06B 9/38

[52] U.S. Cl. .................................. 29/24.5; 160/178 R

[58] Field of Search ....................... 160/178 R; 29/24.5

[56] References Cited

U.S. PATENT DOCUMENTS 3,352,349 11/1967 Hannequin ....................... 160/178 R 4,457,351 7/1984 Anderson ......................... 160/178 R

FOREIGN PATENT DOCUMENTS 222272 3/1959 Australia .......................... 160/178 R 248665 8/1966 Austria ............................ 160/178 R 252538 2/1967 Austria ............................ 160/178 R 222908 10/1966 Sweden .

*Primary Examiner*—Howard N. Goldberg

*Assistant Examiner*—Steven Nichols

*Attorney, Agent, or Firm*—Cushman, Darby & Cushman

[57] ABSTRACT

A stringtape roll for Venetian blinds, where the arresting member for the stringtape of the Venetian blind is constituted by a flexible tongue (7) which is bendably connected to the stringtape roll (1) and intended to be bent to locking engagement against the stringtape roll and thereby to lock the stringtapes which are arranged about this. The tongue (7) and the stringtape roll (1) have locking means corresponding to each other (9, 10) for locking the tongue in locking position against the stringtape roll. The invention furthermore refers to a stringtape jig for locking the tongue (7) to the stringtape roll (1) with the stringtapes in correct position.

4 Claims, 6 Drawing Figures

STRINGTAPE ROLL FOR VENETIAN BLINDS

TECHNICAL FIELD

The present invention refers to a stringtape roll for Venetian blinds having a through channel for receiving and for being nonrotatably connected to the tilting rod of the Venetian blind and being designed with a slotted and tapering end portion and provided with means for axially locking the stringtape roll to the tilting rod and with arresting means for arresting the stringtapes of the Venetian blind, which arresting means is constituted by a tongue formed integral with the stringtape roll and bendably connected thereto and arranged to be bent to contact against the stringtape roll.

At conventional stringtape rolls the arresting means for the stringtapes is constituted by a steel tongue, which is cast integrally with the stringtape roll and projects a short distance from this. The stringtapes are inserted below the tongue, which by means of a punching tool is pressed to engagement against the roll, whereby the stringtapes are fixed below the tongue. This means a complicated manufacture and it is furthermore afterwards impossible to remove the stringtapes from the stringtape roll. At an exchange of stringtapes it is therefore necessary also to exchange the stringtape roll.

In the Swedish patent application No. 8100078-8 is shown a new type of stringtape roll, in which the stringtapes are fixed by means of a slotted sleeve, which resiliently is snapped around the stringtape roll and thereby locks the stringtapes which have been placed around said roll. The sleeve can easily be removed and again be snapped in position at replacement of the stringtapes.

In the Swedish patent 222 908 is described a stringtape roll having a locking tongue for arresting the stringtapes formed integrally with the stringtape roll. The tongue is locked in arresting position by means of a separate socket of complex design, which is to be moved axially up on the stringtape roll to lock the tongue. Such a design is not suited for automatized assembly.

THE PURPOSE AND MOST ESSENTIAL FEATURES OF THIS INVENTION

The purpose of the present invention is to provide a stringtape roll, which is simple to manufacture and which can be formed in one piece of plastic material without subsequent machining. The fixing of the stringtapes shall be effected in a simple manner and the stringtape roll shall be re-usable at replacement of stringtapes. This has according to the invention been achieved thereby, that the connection between the stringtape roll and the said tongue is a hinge, and that the stringtape roll at a distance from said hinge is provided with means intended for locking interconnection with corresponding means at the end of said tongue remote from said hinge, said means being projections and recesses resp. adapted to lock into each other for interconnection with the stringtape roll at a distance from said hinge thereby effecting an arresting of the stringtapes, which are arranged about said stringtape roll over the distance between said hinge and the free end of said tongue, and that the means for axially arresting the stringtape roll on the tilting rod is a ring having an inner diameter, smaller than the outer diameter of a rib-formed collar provided on the slotted end of the stringtape roll in unloaded condition, but somewhat bigger than the diameter thereof when the said end is in compressed condition.

DESCRIPTION OF THE DRAWINGS

The invention will hereinafter be further described with reference to an embodiment shown in the accompanying drawings.

DESCRIPTION OF THE INVENTION

Figure 3:
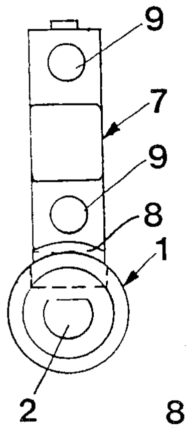
FIG. 3 is a view from the rear side of the stringtape roll according to FIG. 1.
Figure 1:
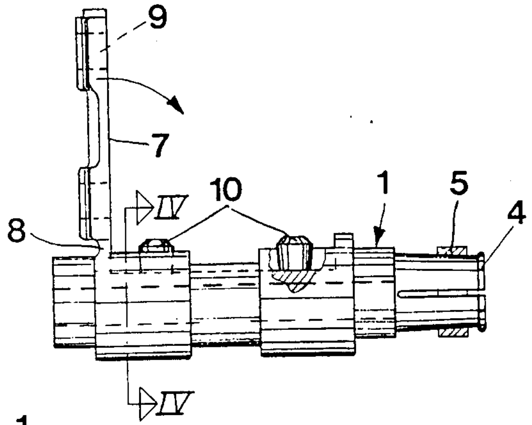
FIG. 1 is a side view of a stringtape roll.

The stringtape roll, which in the drawing is designated 1, is intended to be supported in a bracket (not shown), which is located in a U-shaped carrying rail for a Venetian blind.

Figure 2:
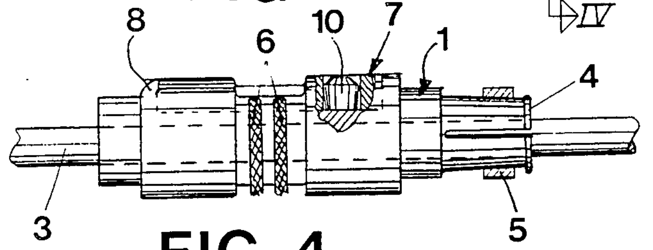
FIG. 2 is a side view corresponding to FIG. 1 but showing the arresting means in locking position.
Figure 4:
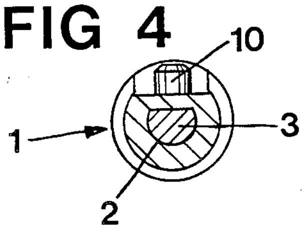
FIG. 4 is a section along line IV—IV in FIG. 1.

The stringtape roll 1 has a through-channel 2 with a non-circular, mainly partly circular cross-section intended to receive a conventional tilting rod 3, a portion of which is shown in FIG. 2. The tilting rod 3 has a non-round cross-section corresponding to that of the channel 2 and it is thus non-rotatably connected to the stringtape roll 1.

The stringtape roll 1 has at one of its ends a slotted, faintly tapering portion ending with a rib-formed collar 4 and intended to be compressed and to pinch the stringtape roll 1 about the tilting rod 3 by means of a ring 5, i.e. to lock the stringtape roll axially in relation to the tilting rod. The inner diameter of said ring 5 is smaller than the outer diameter of the said collar 4 at the end of the stringtape roll, when the slotted end thereof is not subjected to outer forces, but it has a slightly bigger size when the said slotted portion is compressed, thereby allowing the ring 5 to be moved to a locking position, which will be maintained due to the taper and to the collar 4, when the compressing force on the slotted portion is relieved.

For arresting the stringtapes 6 of the Venetian blind to the stringtape roll 1 there is arranged a tongue 7 to be bendably connected to the stringtape roll via a thin material portion 8 which acts as a hinge. The tongue 7 has a number of recesses or holes 9 intended to cooperate with a number of projections or knobs 10 extending from the stringtape roll for locking the tongue to engagement against the stringtape roll in a recess in this and thereby to arrest the stringtapes 6, which are placed around it.

Figure 5:
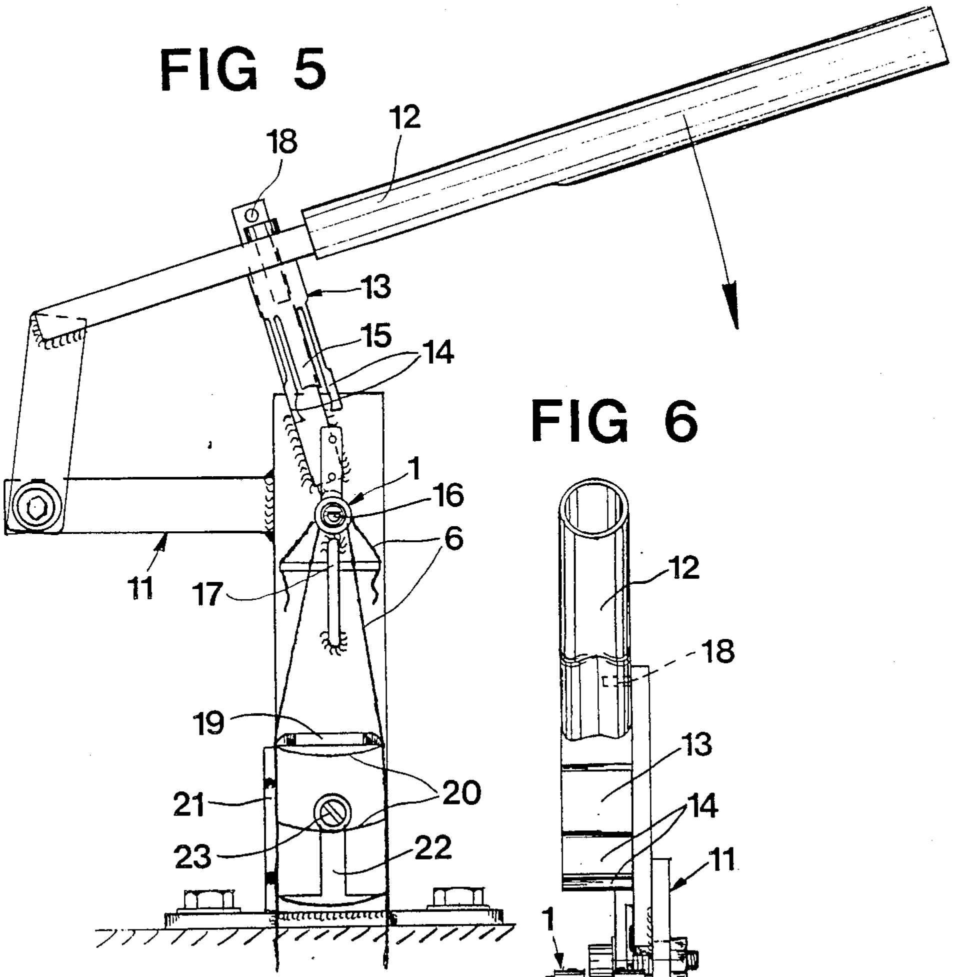
FIG. 5 is a side view of a tool for fixing the stringtape in correct position, a so-called stringtape jig.
Figure 6:
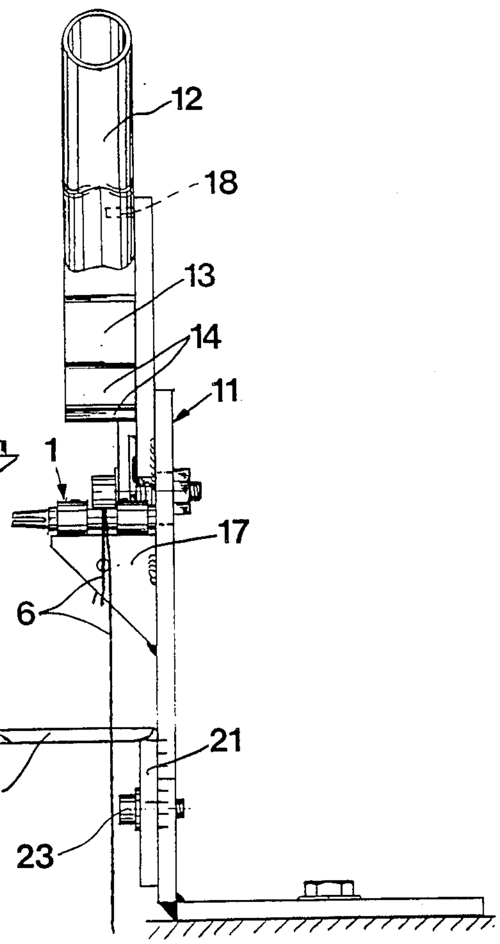
FIG. 6 shows the stringtape jig from the front side.

The stringtape roll according to the invention and also the ring 5 can be formed in one piece from plastic material without subsequent machining. In FIGS. 5 and 6 are shown a tool, a so-called stringtape jig, by means of which the tongue 7 is locked to the stringtape roll 1 with the stringtapes 6 in correct position. The stringtape jig incorporates a stand 11, on which is pivotably supported a one-armed level 12. On the lower side of the lever 12 there is fitted a device 13 preferably made from plastic material, which at its lower end is formed as a pair of arms 14, which can flex apart and between which is arranged a stamp member 15. The arms 14 and the stamp member 15 delimit a partly circular space having mainly the same radius as the stringtape roll 1.

The stand 11 is furthermore provided with a shaft 16, the cross sectional shape of which corresponds to that of the tilting rod, i.e. to that of the stringtape roll 1 and on which the stringtape roll 1 is intended to be displaced. A support 17 is arranged below the shaft 16. The member 13 is located thus that when the lever 12 is lowered the arms 14 will be located just in front of the stringtape roll 1 which is arranged on the shaft 16 and they will flex apart and be snapped around this. The tongue 7 projecting from the stringtape roll 1 thereby will be bent by the stamp member to contact against the stringtape roll 1 and it will be locked to this. The pivoting movement of the lever 13 will be limited in the upwards direction by a pin 18 fitted to the stand 11.

In order to allow arresting of the ends of the stringtapes 6 in correct positions below the tongue 7 there is arranged in the stand 11 below the support 17 a plate 19, the width of which mainly corresponds to the width of the stringtape 1. The ends of the stringtape 6 are arranged about the stringtape roll 1 thus, that one of its transversal strings 20 will be situated horizontally against the lower side of the plate 19. The plate 19 is equipped with a vertical part 21 which acts as a guide and which has an oblong groove 22 in which is received a screw 23. The plate 19 thereby can be displaced vertically and be arrested in different positions.

The invention is of course not limited to the embodiment shown but can be varied within the scope of the appended claims.

What I claim is:

1. A stringtape roll for Venetian blinds having a through channel for receiving and for being nonrotatably connected to the tilting rod of the Venetian blind and being designed with a slotted and tapering end portion and provided with means for axially locking the stringtape roll to the tilting rod and with arresting means for arresting the stringtapes of the Venetian blind, which arresting means is constituted by a tongue formed integral with the stringtape roll and bendably connected thereto and arranged to be bent to contact against the stringtape roll, wherein, the connection between the stringtape roll and the said tongue is a hinge, and that the stringtape roll at a distance from said hinge is provided with means intended for locking interconnection with corresponding means at the end of said tongue remote from said hinge, said means being projections and recesses resp. adapted to lock into each other for interconnection with the stringtape roll at a distance from said hinge thereby effecting an arresting of the stringtapes, which are arranged about said stringtape roll over the distance between said hinge and the free end of said tongue, and that the means for axially arresting the stringtape roll on the tilting rod is a ring having an inner diameter, smaller than the outer diameter of a rib-formed collar provided on the slotted end of the stringtape roll in unloaded condition, but somewhat bigger than the diameter thereof when the said end is in compressed condition.

2. A device for arresting the tongue defined in claim 1 to the stringtape roll with the stringtapes in correct position, comprising in combination, a stand, in which is pivotably supported a one-armed lever, a stamp device being fitted to the lower side of said lever and located thus that it can be moved towards a shaft attached to the stand, and having a cross sectional dimension corresponding to the cross section of the tilting rod and on which shaft the stringtape roll is displaceable, said stamp device being arranged to move said tongue to locking position against the stringtape roll, and a horizontal member being arranged in the stand below the shaft to be vertically displaceable to a limited extention, the width of said horizontal member mainly corresponding to the width of the stringtape and against which member the position of the stringtape can be adjusted thus that its ends are arrested in correct position under the tongue.

3. A device as claimed in claim 2, wherein, said stamp device incorporates a pair of flexible, depending arms arranged to be moved over the stringtape roll and thereby to flex apart and a stamp member provided between said flexible arms.

4. A device as claimed in claim 3, wherein, said arms and said stamp member together delimit a partly circular space, the shape of which corresponds to the shape of the stringtape roll.

* * * * *